United States Patent
Bharti et al.

(10) Patent No.: US 12,131,174 B2
(45) Date of Patent: Oct. 29, 2024

(54) QUANTIFYING SERVICE CHAIN FUNCTIONS OF VIRTUAL MACHINES FOR CROSS INTERFERENCES

(71) Applicant: International Business Machines Corporation, Armonk, NY (US)

(72) Inventors: Harish Bharti, Pune (IN); Rajesh Kumar Saxena, Maharashtra (IN); Sandeep Sukhija, Rajasthan (IN); Deepak Bajaj, Leicester (GB)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 17/363,634

(22) Filed: Jun. 30, 2021

(65) Prior Publication Data
US 2023/0004412 A1 Jan. 5, 2023

(51) Int. Cl.
*G06F 9/455* (2018.01)
*G06F 1/3203* (2019.01)
(Continued)

(52) U.S. Cl.
CPC ........ *G06F 9/45558* (2013.01); *G06F 1/3203* (2013.01); *G06F 9/5077* (2013.01);
(Continued)

(58) Field of Classification Search
None
See application file for complete search history.

(56) References Cited

U.S. PATENT DOCUMENTS

| | | | |
|---|---|---|---|
| 2004/0203727 A1* | 10/2004 | Abiri | H04W 16/06 455/423 |
| 2005/0203877 A1* | 9/2005 | Baggenstoss | G06N 5/01 |

(Continued)

FOREIGN PATENT DOCUMENTS

| | | |
|---|---|---|
| CN | 108260169 A | 1/2018 |
| CN | 109560961 A | 11/2018 |

OTHER PUBLICATIONS

Xie et al., "Service Function Chaining Resource Allocation: A Survey." University of Electronic Science and Technology of China. Jul. 30, 2016. 12 pages.

(Continued)

*Primary Examiner* — Abu Zar Ghaffari
(74) *Attorney, Agent, or Firm* — Scully, Scott, Murphy & Presser, P.C.; Michael A. Petrocelli, Esq.

(57) ABSTRACT

A system, method, and computer program product for determining "impact quantify measure-based" service chains cross interferences. The method includes quantifying the impact of one service chain on another service chain and to what extent so as facilitate making an informed decision whether to garner more resources and to fine tune the computational services for the service chain. There is further provided beforehand a certainty of required computational resources and the providing the impact or interferences details of one service chain on another helps in minimization of service quality degradation failures. The framework further runs a method step to apply a mutual convexity method on service chains to aid in forecasting cross interferences between chains and includes a step wherein, interferences between both dependent and independent service chain is calculated and provided. The provided interferences calculated result set will ensure while provisioning of virtual network functions doesn't consume energy excessively.

11 Claims, 8 Drawing Sheets

(51) Int. Cl.
  *G06F 9/50* (2006.01)
  *G06F 17/18* (2006.01)
  *H04L 41/0895* (2022.01)
  *H04L 41/50* (2022.01)

(52) U.S. Cl.
  CPC .......... *G06F 17/18* (2013.01); *H04L 41/0895* (2022.05); *H04L 41/50* (2013.01); *G06F 2009/45595* (2013.01)

(56) References Cited

U.S. PATENT DOCUMENTS

| | | | |
|---|---|---|---|
| 2016/0277509 A1* | 9/2016 | Qiang | H04L 67/1001 |
| 2016/0283290 A1* | 9/2016 | Porat | H04L 67/567 |
| 2016/0380848 A1* | 12/2016 | Raney | H04L 67/131 |
| | | | 709/213 |
| 2017/0177396 A1* | 6/2017 | Palermo | G06F 9/45558 |
| 2017/0371692 A1* | 12/2017 | Connolly | G06F 9/45558 |
| 2018/0063018 A1* | 3/2018 | Bosch | H04L 47/822 |
| 2018/0225139 A1* | 8/2018 | Hahn | G06F 9/5077 |
| 2018/0307538 A1* | 10/2018 | Meng | G06F 9/5061 |
| 2018/0351874 A1* | 12/2018 | Abhigyan | H04L 67/01 |
| 2019/0363926 A1* | 11/2019 | Singhal | G06F 9/5077 |
| 2020/0028749 A1* | 1/2020 | Dhandu | H04L 12/4641 |
| 2020/0358521 A1* | 11/2020 | Alagha | H04J 11/004 |
| 2021/0028990 A1* | 1/2021 | Han | H04L 45/64 |
| 2021/0184925 A1* | 6/2021 | Narayanan | H04L 41/083 |
| 2021/0184945 A1* | 6/2021 | Ranjit | H04L 43/0823 |

OTHER PUBLICATIONS

Zhang et al. "Adaptive Interference-Aware VNF Placement for Service-Customized 5G Network Slices." Huazhong University of Science and Technology, China. May 2, 2019. 10 pages.

Zhao et al., "On Orchestrating Service Function Chains in 5G Mobile Network." IEEE Access, doi: 10.1109ACCESS.2017. Apr. 8, 2019. 15 pages. vol. XX, 2018.

Hu et al., "Enabling Efficient Network Service Function Chain Deployment on Heterogeneous Server Platform." 2018 EEE International Symposium on High Performance Computer Architecture. Feb. 28, 2018. pp. 27-39.

* cited by examiner

QUANTIFYING SERVICE CHAIN FUNCTIONS OF VIRTUAL MACHINES FOR CROSS INTERFERENCES

BACKGROUND

Network function virtualization (NFV) is an evolving powerful technique which decouples network functions from the hardware. It allows virtualization of various network functions. Some of the connected network functions defines a service chain, which may be a sequence of network virtualized functions including, e.g., a firewall, an intrusion detection system (IDS), a load balancer, a network optimizer, an address translation component, a proxy, and many others.

These virtual network functions are functions running as virtual machines on servers which are organised as a chain through service chain function. NFV concept has significantly improved the flexibility and agility. But the flexibility of deployment of service chain functions not only increases network configuration complexity but also leads to the uncertainty of allocation of network resources, i.e., optimization of resources needs to be taken care.

During the build and deployment of a service chain, it is provisioned on the service platform (Service Servers). When service chains are developed on a virtualized network, e.g., a 5G Core (5GC), it is built and provisioned on the same service platform (service servers). These services may or may not be dependent on each other during an event. Now there is a high probability of uneven computational resource allocation to the service chain which will lead to the interferences between service chains. This interference may lead to more service quality degradation failures.

BRIEF SUMMARY

A system, method, and computer program product described herein provide a framework to quantify the impact of a one provisioned service chain on another service chain in a virtualized network.

The provided framework to quantify the impact of a provisioned service chain on another service chain is used to assist in making an informed decision whether to garner more resources and/or to fine tune the computational services for the service chain in the virtualized network in order to reduce performance degradation of the virtualized network.

A system, method, and computer program product described herein provide a framework to quantify the impact of a service chain on another service chain by generating and applying a Mutual Convexity method on the service chain to assist in forecasting the cross interferences of the service chain.

In an exemplary embodiment, the forecasting of the cross interferences of the service chain assists in determining whether to spin up more servers which will fine tune the computational requirements of service chain.

In an aspect of the present disclosure, there is provided a computer-implemented method comprising: receiving, at one or more hardware processors, event data generated by at least two service chains provisioned to provide services on computing devices of a virtualized network; generating, at one or more hardware processors, a joint probability function based on co-occurring event data generated by the at least two service chains; determining, based on the generated joint probability function, a cross-interference impact of a first service chain upon a second service chain of the provisioned at least two service chains; and based on the determined cross-interference impact, modifying, using the one or more hardware processors, a provisioned resource on the computing devices to avoid a service quality degradation.

In a further aspect, there is provided a system for managing resources of a service chain comprising: at least one processor comprising hardware, the at least one processor configured to: receive event data generated by at least two service chains provisioned to provide services on computing devices of a virtualized network; generate a joint probability function based on co-occurring event data generated by the at least two service chains; determine, based on the generated joint probability function, a cross-interference impact of a first service chain upon a second service chain of the provisioned at least two service chains; and based on the determined cross-interference impact, modify a provisioned resource on the computing devices to avoid a service quality degradation.

In some aspects, a computer readable storage medium is disclosed that includes instructions that, when executed by at least one processor including hardware, configures the at least one processor to: receive event data generated by at least two service chains provisioned to provide services on computing devices of a virtualized network; generate a joint probability function based on co-occurring event data generated by the at least two service chains; determine, based on the generated joint probability function, a cross-interference impact of a first service chain upon a second service chain of the provisioned at least two service chains; and based on the determined cross-interference impact, modify a provisioned resource on the computing devices to avoid a service quality degradation.

In aspects of the present disclosure, apparatus, systems, and computer program products in accordance with the above aspect may also be provided. Any of the above aspects may be combined without departing from the scope of the present disclosure.

BRIEF DESCRIPTION OF THE DRAWINGS

The details of the present disclosure, both as to its structure and operation, can be understood by referring to the accompanying drawings, in which like reference numbers and designations refer to like elements.

DETAILED DESCRIPTION

The aspects disclosed herein provide solutions to minimize excessive computation resource utilization in provisioning of service chains in a network slice.

Network service chains refers to a series (toolchains) of functions stung together to form a composite service that an entity can use. The service chain (SC) is a sequence of software-defined networking capabilities to create a chain of connected virtualized network services, e.g., such as the open system interconnect (OSI) L4-7 network functions including, but not limited to: load balancing, web application firewalls, service discovery, network address translation (NAT), intrusion protection, proxies, and monitoring for network layers within the OSI model.

Typically, the service chain is a sequence of virtualized network functions (VNFs) through which end-to-end data streams pass and which are intended to replace a chain of premises equipment.

Network operators use these service chains to set up suites or catalogs of pathways for traffic to travel through and automate the way virtual network connections can be set up to handle traffic flows for connected services. Any one path can consist of any combination of connected services depending on the traffic's requirements. Different traffic requirements might be more security, lower latency, or an overall high quality of service (QoS).

As referred to herein, "5G" is the 5th generation of mobile networks and 5G Core (5GC) is the component of a 5G mobile network that functions to establish reliable, secure connectivity to the network for end users and provide access to services. Such 5GC is configured to handle a wide variety of essential functions in the mobile network, e.g., connectivity and mobility management, authentication and authorization, subscriber data management and policy management, etc. Such 5G Core network functions are completely software-based and they are agnostic to any underlying cloud infrastructure, allowing higher deployment agility and flexibility.

5G network slicing is the network architecture that enables the multiplexing of virtualized and independent logical networks on the same physical network infrastructure. Each network slice is an isolated end-to-end network between a source and a consumer tailored to fulfil diverse requirements requested by a particular application.

Figure 1:
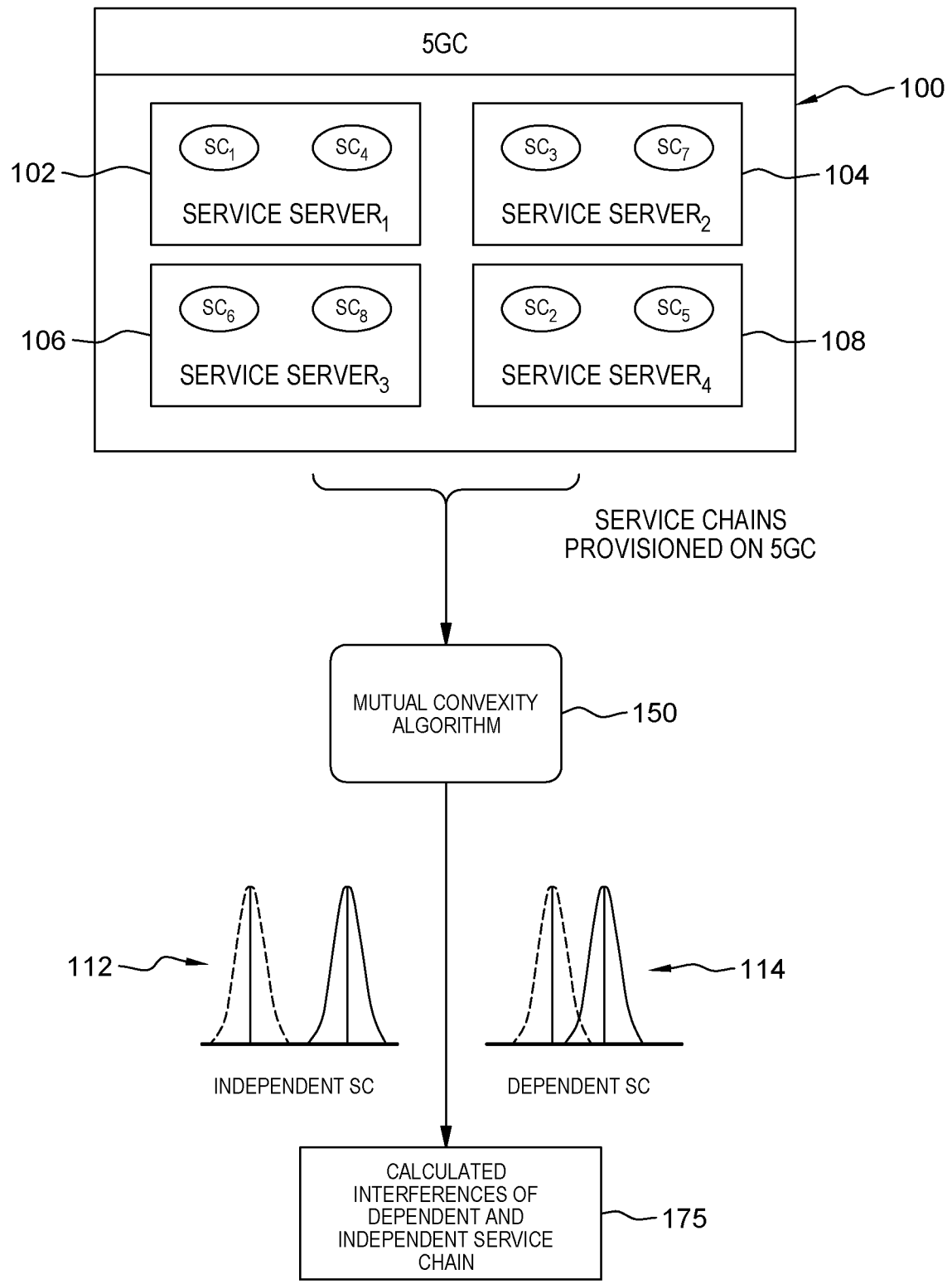
FIG. 1 is a system diagram illustrating an example 5G core that provisions network slices to feature service chains initiated and managed through centralized hosts of Service Servers that forms a part of 5GC in accordance with a disclosed embodiment.

FIG. 1 depicts an example 5G core 100 that enables the network slice to feature service chains, e.g., service chains $SC_1$, $SC_2$, ..., $SC_8$. These service chains are initiated and managed through a central host of service servers that form a part of 5GC. For example, a service server 102 hosts service chains $SC_1$ and $SC_4$, a service server 104 hosts $SC_3$ and $SC_7$, a service server 106 hosts $SC_6$ and $SC_8$, and a service server 108 hosts $SC_2$ and $SC_5$. All of these Service Chains (represented in FIG. 1 as SC1 to SC8, but there can be many more provisioned), are an integral part of 5G Core (5GC). 5GC provisions these service chains internally through virtualized servers and each server could by design host more than one service chain(s), e.g., Server 102 hosting SC1, SC4, Server 104 hosting SC3, SC7, etc. The information technology (IT) processing is internal to the 5GC. Given the randomness of the bandwidth and computational demands in 5GC, the computational power is uneven across the core. For example, the implementation of a network function should not consume energy excessively. To address this, in an embodiment, the 5GC performs applying a Mutual Convexity method 150 on the service chains for use in forecasting cross interferences between two service chains including independent service chains 112 and dependent service chains 114. A calculated interferences set 175 results that is used to help forecast interferences between service chains, ensures that while provisioning of virtual network functions on dependent service chains and independent service chains, excess energy is not consumed.

Figure 2:
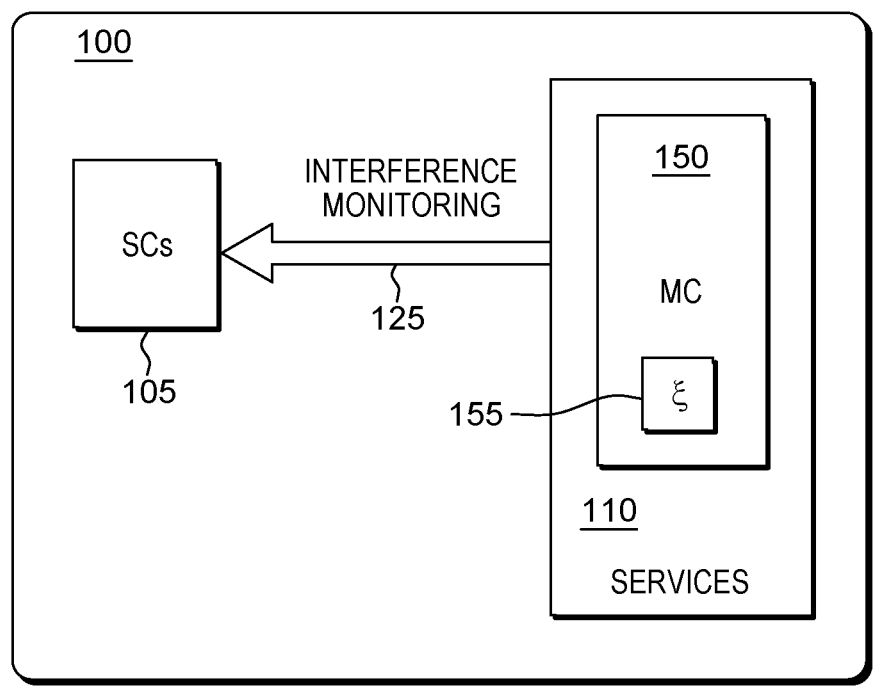
FIG. 2 depicts a computing node running services on the 5G core to performs a Mutual Convexity method according to an embodiment herein.

More particularly, in an embodiment as shown in FIG. 2, a computing node running services 110 on the 5G core 100 performs the Mutual Convexity method 150 which is a service configured to: monitor 125 the provisioned service chains 105, identify any interferences, and responsively determine a value "ξ" 155 quantifying an impact of one provisioned SC, e.g., $SC_1$, upon another SC, e.g., $SC_2$ and to what extent. The 5GC performs applying the Mutual Convexity value 155 on the service chain for use in forecasting cross interferences between two service chains. The calculated interferences result set is used to assist in forecasting interferences between service chains, e.g., ensure that while provisioning of virtual network functions on dependent service chains and independent service chains, excess energy is not consumed.

Figure 3:
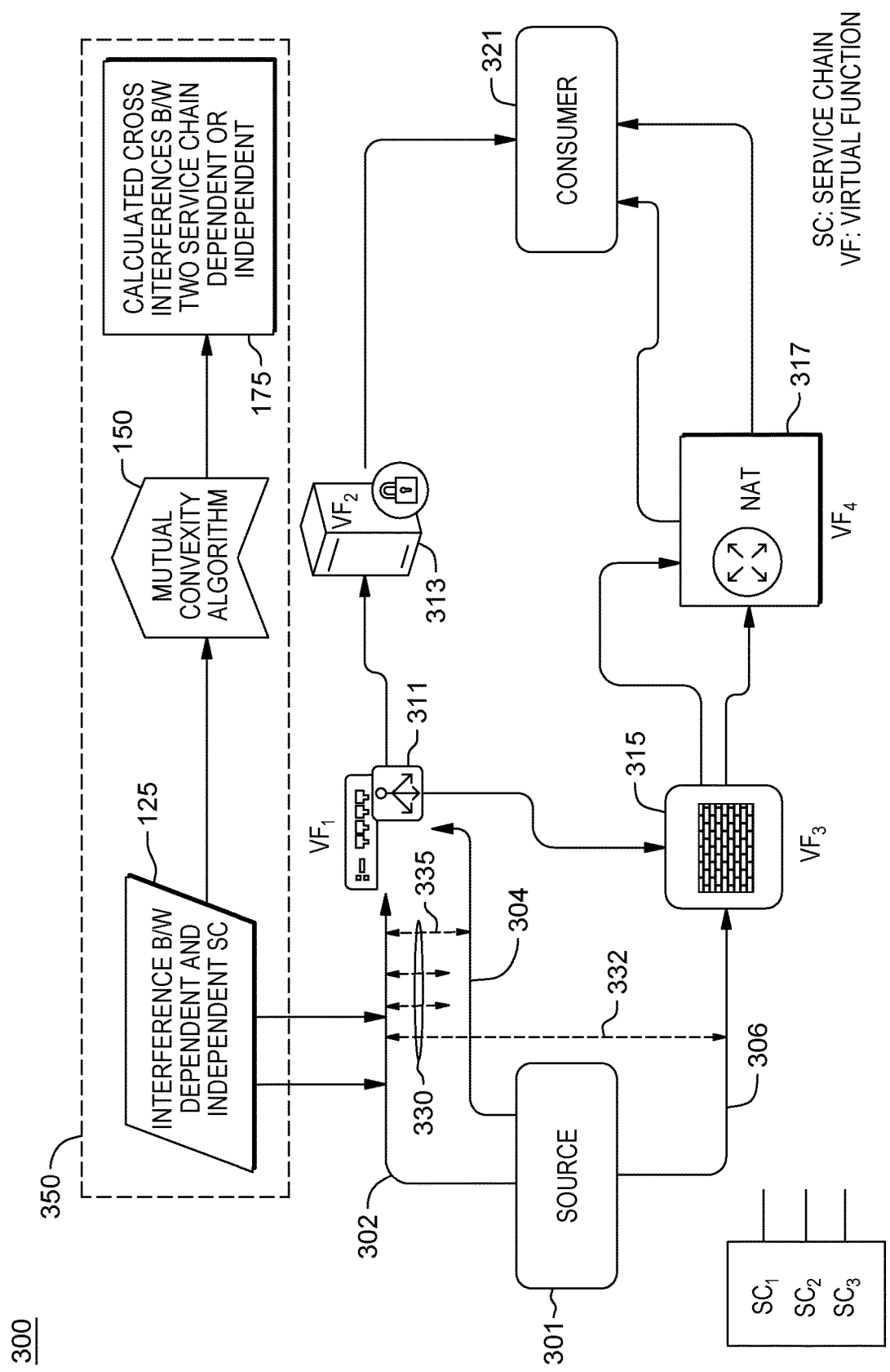
FIG. 3 depicts an architectural framework to identify the service chain interferences on a 5G core.

FIG. 3 depicts an example framework 300 to identify the service chain interferences on a 5G core. In the framework 300, there is depicted example provisioned service chains, $SC_1$ 302, $SC_2$ 304, $SC_3$ 306 each implementing a sequence of virtual functions (VFs) intended to replace a chain of premises equipment. The service chains $SC_1$-$SC_3$ are each configured for network slice communications on the 5G core, e.g., for moving encrypted traffic between a source 301 and a consumer entity 321. Source 301 refers to any entity that is requesting the specific service, e.g., an application that wants a specific service to complete its task, and a consumer 321 is necessarily a piece of software that provides the specific information or does a specific work of the requested services.

In the example framework shown in FIG. 3, virtualized function VF1 311 represents a routing enabler providing a virtualized function for the service chains 302, 304 to route packets so that the traffic moves to the right destination; VF2 313 represents an encryption and security device that provides virtualized functions for multiple security-based utilities (features), e.g., encryption, redacting, key management, etc. for the service chain 302; VF3 315 represents a firewall and provides a virtualized function for the service chains 304, 306 enabling a configuration of rules such as what traffic can be moved to which part of the network; and VF4 317 represents a virtualized function for NAT (Network Address Translation) that allows the hiding of the source of the traffic so that it can be mobilized to parts of network without the destination being aware of the source(s) in the service chains 304, 306. Using these VFs, several services that use them in combinations comprise the illustrative service chains including: e.g., $SC_1$—a service chain configured for moving encrypted traffic from a source 301 to the consumer 321 of this traffic; $SC_2$—a service chain configured for moving specific traffic (one that is allowed by the firewall) without encryption to the consumer such that the source is anonymized; and $SC_3$—a service chain configured for moving specific traffic (one that is allowed by the firewall) without encryption to the consumer 321 such that the source is anonymized. This is thought to be done directly from a known node within the network (e.g., referred to as a bastion node) and thus does not need routing provided from VF1.

As further shown in FIG. 3, the vertical lines 330 such as lines 332 between SC1 and SC3 and lines 335 between SC1 and SC2 represent the determined service chain "interferences". These interferences 330 form the corresponding necessary constraint in evaluating the network. As an example, the 5GC configures the $SC_1$ as a service that is providing a location data to the consuming application 321 and $SC_2$ is requesting a (consumer) application to execute a code and provide update on certain data about the source 301. In such a case, if there is a "unsure" data that lands on $SC_1$, it might require more resources. If these resources are "shared" with another service chain (for this consideration, e.g., $SC_2$) then $SC_2$ will have to wait more than expected before it can see the execution through.

As further shown in FIG. 3, a computing node 350 of the 5G core receives data associated with events generated by each service chain $SC_1$, $SC_2$, $SC_3$. As an example, an "event" is a determination of an instance in time or as an eventuality when the interference is established. For example, when $SC_1$ encounters "unsure" data that requires more resources to process and these resources allocated are shared with $SC_2$—this results in creating an event when the normal execution of $SC_2$ can be hindered (represented by the probability).

This received events data 125 is input to the Mutual Convexity method 150 where the data is processed to determine a value 155 quantifying a cross-interferences impact 175 of a provisioned (dependent or independent) service chain, e.g., between $S_1$ and $S_2$, $S_2$ and $S_3$ or $S_1$ and $S_3$. The quantified cross-interferences impact 175 is used to minimize service quality degradation failures or alternatively is used to optimize 5GC virtual network function(s) resources.

Figure 4:
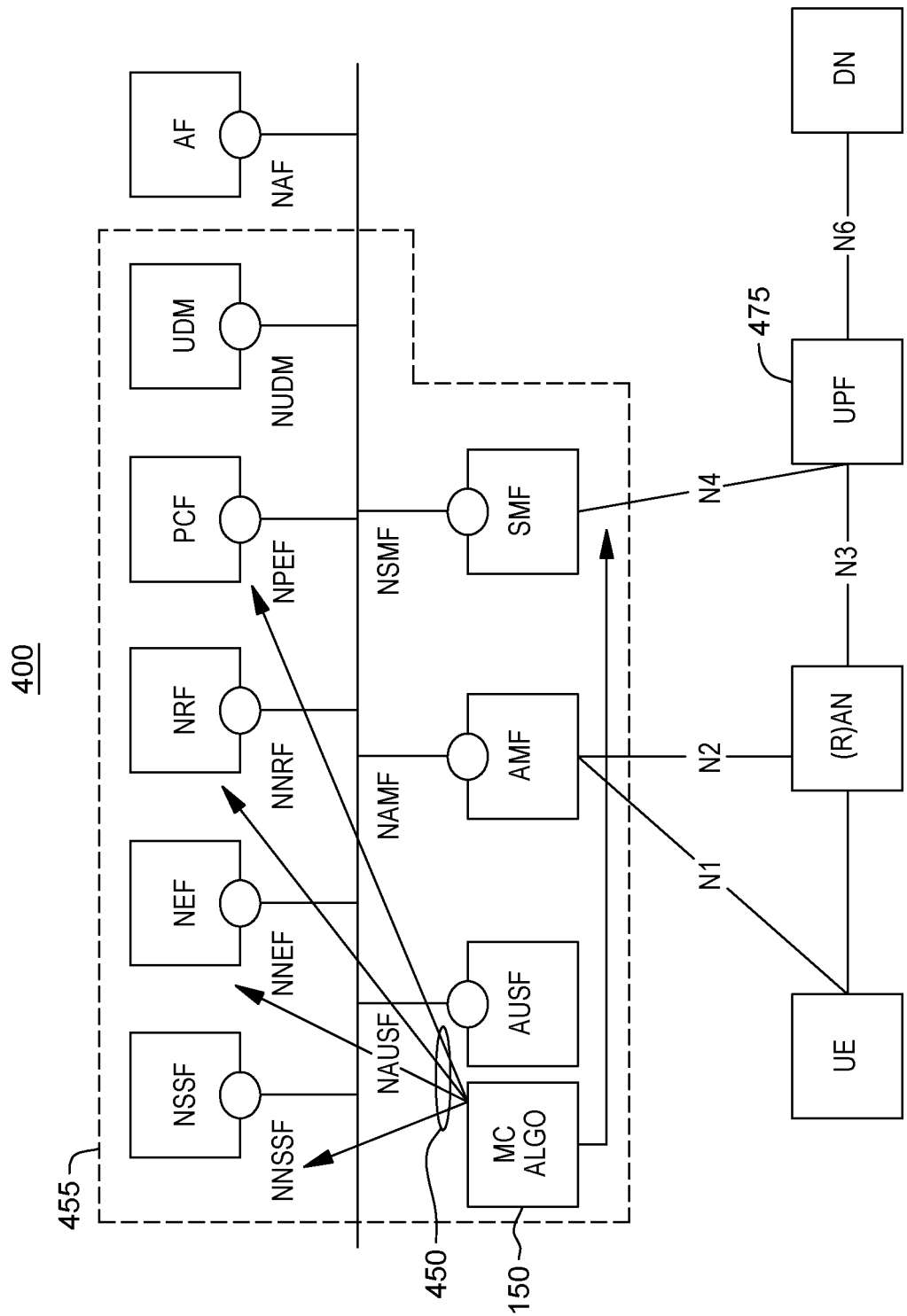
FIG. 4 depicts a block diagram of an embodiment of a 5G core system architecture showing how various network functions interact with each other including an overlay of the MC method in an embodiment.

In an embodiment, one more software program modules run code to configure an additional service employed (deployed) by the 5GC to run methods having access to the resource provisioning of the service chains $SC_1$-$SC_3$ of 5GC. That is, as shown in FIG. 4, the mutual convexity algorithm 150 is run in a service that is a part of the 5GC and will reside as a code on the 5GC virtualized server. One module in executes code running the Mutual Convexity (MC) algorithm and is triggered to run responsive to a new resource being allocated to a particular service chain, as in the example, when SC1 encounters "unsure" data that requires more resources to process.

With reference to FIG. 4, there is depicted a block diagram of an embodiment of a 5G core system architecture 400 showing how various network functions interact with each other including an overlay of the MC method 150. The 5G core system architecture supports data connectivity using network function virtualization and software defined networking.

In the 5G architecture, procedures are defined as services, and FIG. 4 shows the architecture using a service-based representation and a reference point representation. The service-based representations are shown by referencing applicable network functions (e.g., Nnssf, Nnef, Nnrf, etc.), whereas reference point representations are shown as point-to-point references (e.g., N1, N2, N4). The 5G System architecture 400 includes the following network functions (NF): Authentication Server Function (AUSF), Access and Mobility Management Function (AMF), Data Network (DN), Network Exposure Function (NEF), Network Repository Function (NRF), Network Slice Selection Function (NSSF), Policy Control Function (PCF), Session Management Function (SMF), Unified Data Management (UDM), User Plane Function (UPF) 475 (also referred to as user plane 475), Application Function (AF), User Equipment (UE), and (Radio) Access Network ((R)AN), which are described, for example, in "5G; System Architecture for the 5G System," ETSI TS 123 501 version 15.3.0, dated September 2018, and published by the European Telecommunications Standards Institute.

The configuration shown in FIG. 4 is a Control-/User Plane Separation (CUPS) architecture that has a control plane 455 that carries the signaling traffic and a user plane 475 that carries the network user traffic. The configuration shown in FIG. 4 also includes an authentication server function (AUSF), a unified data management (UDM), an SMF, (e.g., in communication with a data network (DN)), policy control functions (PCFs), and authorization functions (AFs). In addition, the illustrated configuration includes other functions or entities not displayed within the figure, or may not include one or more of the functions or entities shown. Various interfaces may be established between the different entities in the illustrated embodiment. The interfaces may be denoted by N numbers, and sometimes may be called communication links. Such interfaces may refer to a communication link between network entities, a packet scheme, data permissions allowed between the entities, other features of the communication links, or combinations thereof.

The AUSF provides authentication services for UEs. For example, AUSF initiate authentications of a UE and provides network attached storage (NAS) security functions for a UE based on a request from AMF over communication link N1. In some cases, the authentication and security function may be based on information stored in an entity (e.g., a UDM). The entity, (e.g., a UDM) may support an authentication credential repository and processing function (ARPF) that stores the long-term security credentials used in authentication. The AUSF retrieve information from the entity (e.g., UDM) over a communication link.

The SMF provides session management services for UE. Specifically, SMF establishes, modifies, and releases sessions (or bearers) for communication between UE and DN. For example, SMF may maintain a tunnel for communication between UPF and an access network (AN) node. In addition, SMF allocates and manages IP addresses for the UE, select and control user plane functions, configure traffic steering at UPF to route traffic to proper destinations, terminate SM parts of NAS messages, provide roaming functionality, etc.

The UPF include functionality for serving as the point of interconnect to DN for an external PDU session. The UPF routes and forwards packets to and from DN, inspect packets and enforce policy rules in the user plane 475, report traffic usage, handle quality of service (QoS) for user plane packets, verify uplink traffic, etc. The PCF supports a unified policy framework to govern the behavior of the network. Specifically, the PCF provides policy rules to control plane 455 functions to enforce them. In some cases, the PCF retrieves subscription information from a subscription repository at a UDM. The AF supports services for authorizing a UE for access to a network.

The PCF manages policies for the various UEs of the wireless communications system architecture. The core network communicates policies to UEs in the wireless communications system architecture to improve the quality of communication links and improve the quality of service. The PCF may interact with a number of other functions (e.g., AMF and SMF) in a wireless communications system architecture.

The AMF is configured to provide policy information from the PCF to the UEs. The PCF includes such policy information stored on memory or the like. The policy information may be communicated between the PCF and the AMF via a network interface or a communication link. In some examples, the network interface is an Ni interface. The policy information includes access network discovery and selection policy, route selection policies, a Session and Service Continuity (SSC) mode selection policy, a network slice selection policy, a Data Network Name (DNN) selection policy, a non-seamless offload policy, other policies or combinations thereof. The access network discovery and selection policy is used by the UE for selecting non-3GPP accesses and for deciding how to route traffic between the selected 3rd Generation Partnership Project (3GPP) and non-3GPP accesses. The route selection policies are used by the UE to determine how to route outgoing traffic. Traffic can be routed to an established Protocol Data Unit (PDU) session, can be offloaded to non-3GPP access outside a PDU session, or can trigger the establishment of a new PDU session. In some examples, the route selection policies may include the SSC mode selection policy, the network slice selection policy, the DNN selection policy, and/or the non-seamless offload policy.

The SSC Mode Selection Policy (SSCMSP) is used by the UE to associate UE applications with SSC modes and to determine the PDU session which this traffic should be routed to. It is also used to determine when a new PDU session should be requested with a new SSC mode. The network slice selection policy (NSSP) is used by the UE to associate UE applications with SM-NSSAIs and to determine the PDU session which this traffic should be routed to. It is also used to determine when a new PDU session should be requested with a new SM-NSSAI. The DNN Selection Policy is used by the UE to associate UE traffic with one or more DNNs and to determine the PDU session which this traffic should be routed to. It may also be used to determine when a PDU session should be requested to a new DNN. It may also indicate the access type (3GPP or non-3GPP) on which a PDU session to a certain DNN should be requested. The non-seamless offload policy may be used by the UE to determine which traffic should be non-seamlessly offloaded to non-3GPP access (e.g., outside of a PDU session).

In some wireless systems (e.g., a 5G wireless system), a UE accesses a DN to exchange data packets using a PDU session. The PDU session provides a PDU connectivity service, which supports the transmission of one or more PDUs between UE and the DN. An association between UE and the DN in a PDU session uses internet protocol (IP) or Ethernet, or the association is unstructured. In some cases, DN is an example of a local DN, central DN, public land mobile networks (PLMNs), etc.

As illustrated the different functions of the core network 400 is virtualized to support a more flexible architecture. That is, the different functions described above may be implemented in software. In such cases, a UE communicates with DN, SMF, PCF, etc. via the N3 communication link between RAN and UPF. The N3 communication link is a data connection for the UE.

As shown in FIG. 4, the MC service running the MC algorithm 150 that is a part of the 5GC uses 450 the 5GC core components as follows: The NSSF (Network Slice Selection Function) is used to identify which network slice will be allocated to which virtualized server. This is also governed by the PCF—Policy Control Function. The allocated resources will be updated in the NRF—Network Repository Function. Once the resources are locked in, the sessions will be updated accordingly in the SMF—Session Management Function. The Alerts that will be generated are created in the NEF—Network Exposure function.

Figure 5:
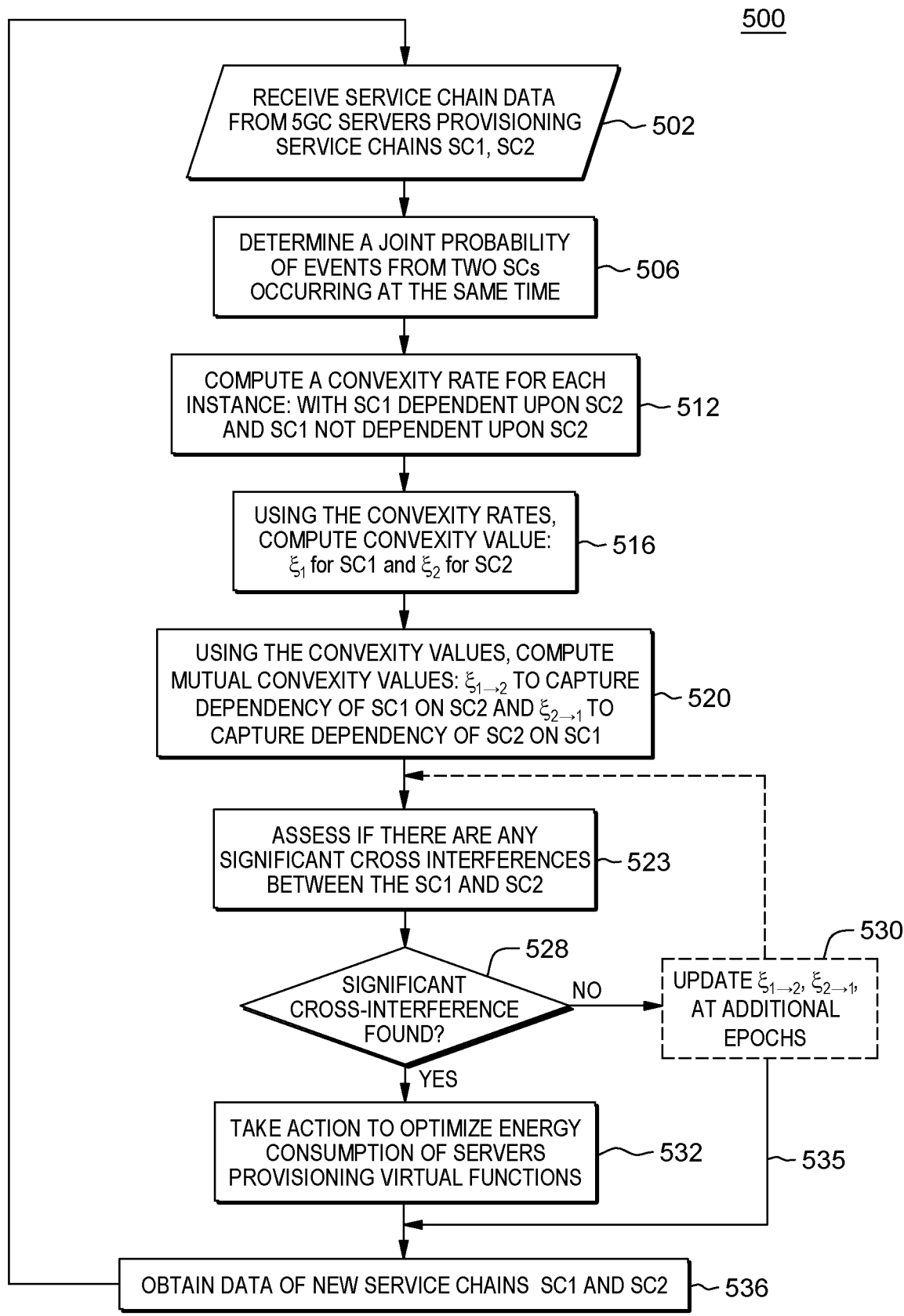
FIG. 5 is an exemplary method run at a computer system to determine the mutual convexity values according to embodiments herein.

FIG. 5 depicts a mutual convexity computation method 500 run at the 5GC MC service to identify the dependent and/or independent service chain interferences. At 502, a first step is to receive data monitored from 5G core servers that provide network slice functions provisioning service chains, e.g., service chains $SC_1$ and $SC_2$.

Based on the two service chains events received, there is obtained two discrete random variables (e.g., use of an SC resource). For two discrete random variables X and Yt the probability distribution functions are p(x) and p(y) respectively. At 506, FIG. 5, there is computed the joint probability of events x and y occurring at the same time is p(x,y), i.e., the joint event probability distribution, or the probability that the event will be fired that can cause the interference is represented by a form of Shannon's entropy formulation and is the entropy H(x) defined according to equation 1) as follows:

$$H(x) = -\sum_x p(x) \log p(x) \quad (1)$$

wherein entropy H(x) is a measure of the information content of a random variable.

The MC method is triggered at the receipt of a detected event, however, as there is information asymmetry (referred as entropy in equation 1), there is only probabilistic surety that this will cause interference. What remains unknown is how this will play out—e.g., build a significant disruption of execution plan for $SC_1$ or $SC_2$. Thus, using the SMF (Session Management Function) MC will be able to update the joint probability value. This value is used to ascertain the convexity for individual chains as described herein with respect to equations 5) and 6).

Supposing two service chains which generate events: then at 512, FIG. 5, there is generated a convexity rate that is defined as the amount of additional information required to represent the value of the next observation of one of the service chains, e.g., $h_1$, $h_2$ as follows:

$$h_1 = -\sum_{x_{n+1}} p(x_{n+1}, x_n, y_n) \log p(x_{n+1} | x_n, y_n) \quad (2)$$

And supposing that value of observation $x_{n+1}$ was not dependent on the current observation $y_n$, there is generated:

$$h_2 = -\sum_{x_{n+1}} p(x_{n+1}, x_n, y_n) \log p(x_{n+1} | x_n) \quad (3)$$

In a non-limiting example of determining an amount of 'additional information' required to represent the value of the next observation of one of the service chains, the following times are considered in an example:

At t=0, A "unusual" data is encountered to $SC_1$—this will raise a request for additional resources requirement for $SC_1$. The available resource is with $SC_2$ and so resources is "shared" among $SC_1$ and $SC_2$.

At t=1, $SC_1$ will be provided with a resource required for the additional process. Thus, at time t=0, the event is fired which is dependent on a shared resource between $SC_1$ and $SC_2$. $H_1$ will come into play but it is uncertain at this stage how much of this shared resource is going to impact the normal execution of the $SC_2$ (represented as the information entropy). The more certain of the level of shared resource utilization by both $SC_1$ and $SC_2$, the more certain it can be of the (joint) probability that this conduct can be isolated as an interference. But, at the time t=0, the system is in dearth of this "additional information" and it ascertains this in a subsequent observation. Thus, the entropy value is updated at a next time epoch, e.g., periodically, such as every 10 ms, or updated according to an applied industry standard.

To know whether a value of observation $x_{n+1}$ is dependent or not on a current observation $y_n$ depends entirely if there is a resource which is additionally shared on a request of a service chain and this resource is currently serving another service chain.

The quantity $h_1$ represents the convexity rate for the two service chains, and $h_2$ represents the convexity rate assuming that $x_{n+1}$ is independent of $y_n$. Then, at 516, FIG. 5, there is obtained mutual convexity $\xi$ from equations (2) and (3) according to:

$$\xi::(h_2 - h_1) = -\sum\nolimits_{x_{n+1}} p(x_{n+1}, x_n, y_n)\log p(x_{n+1}|x_n) + \sum\nolimits_{x_{n+1}} p(x_{n+1}, x_n, y_n)\log p(x_{n+1}|x_n, y_n) \quad (4)$$

Rearranging, using the joint probability value there is ascertained the convexity for individual chains—according to equations 5), 6) as:

$$\xi_1 = \sum\nolimits_{x_{n+1}, x_n, y_n} p(x_{n+1}, x_n, y_n) \log\left(\frac{p(x_{n+1}, x_n, y_n)}{p(x_{n+1}|x_n)}\right) \quad (5)$$

$$\xi_2 = \sum\nolimits_{x_{n+1}, x_n, y_n} p(y_{n+1}, x_n, y_n) \log\left(\frac{p(y_{n+1}, x_n, y_n)}{p(y_{n+1}|y_n)}\right) \quad (6)$$

The convolved probabilities can be resolved to conditional probabilities according to equations 7) and 8) as follows:

$$p(x_{n+1}, x_n, y_n) = \frac{p(x_{n+1}, x_n, y_n)}{p(x_n, y_n)} \quad (7)$$

$$p(x_{n+1}|x_n) = \frac{p(x_{n+1}, x_n)}{p(x_n)} \quad (8)$$

At 520, FIG. 5, the method performs a rewriting of equation 5 and 6 using equation 7 and 8 to obtain the "mutual convexity" values catering to the interferences according to equations 9) and 10) as follows:

$$\xi_{1\to 2} = \sum\nolimits_{x_{n+1}, x_n, y_n} p(x_{n+1}, x_n, y_n) \log\left(\frac{p(x_{n+1}, x_n, y_n) \cdot p(x_n)}{p(x_{n+1}, x_n) \cdot p(x_n, y_n)}\right) \quad (9)$$

$$\xi_{2\to 1} = \sum\nolimits_{x_{n+1}, x_n, y_n} p(x_{n+1}, x_n, y_n) \log\left(\frac{p(y_{n+1}, x_n, y_n) \cdot p(y_n)}{p(y_{n+1}, y_n) \cdot p(x_n, y_n)}\right) \quad (10)$$

where equation 9) depicts the dependency of service chain 1 on service chain 2 and equation 10) represents the dependency of service chain 2 on service chain 1.

Here, the method resolves the mutual convexity factors $\xi_{1\to 2}$ and $\xi_{2\to 1}$ which can be used to quantify and assess if there are any significant cross interferences between the two service chains as indicated at 523, FIG. 5.

That is, the $\xi_{1\to 2}$ and $\xi_{2\to 1}$ factors are available as metrics within the 5GC and they are constantly monitored so that the shared resources that are creating interferences are handled properly, e.g., provisioned with more compute power, cloned, time multiplexed, etc., or fine tune computational services of service chains, optimize resources, or take any other action capable of minimizing any potential service quality degradation/failure.

Thus, the mutual convexity method is configured to identify what is the best next action for each service chain. As a shared resource has joint servicing by a common resource, it creates a level of dependency between the 2 service chains. Before the resources are jointly provisioned they are configured as having independent execution plans, but after the shared resource is provisioned, the execution plan for both the service chains will not intersect, but it will depend on this shared resource jointly. Thus, it is important to isolate the impact of this interference which are represented as conditional probabilities. Functionally, these are tracked by the mutual convexity algorithm as $SC_1$ dependence on $SC_2$ and $SC_2$ dependence on $SC_1$. They will be different values depending on the criticality of the service that is provided by this shared resource.

Returning to 523, FIG. 5, the Mutual Convexity algorithm at this stage is made aware that $SC_1$ and $SC_2$ have a joint probability of interference. At 528, FIG. 5, a decision is made as to whether a "significant" cross-interference threshold has been reached. If a "significant" cross-interference threshold is determined as not being reached, the process continues to 530 to check at subsequent epochs (or periodically) whether the mutual convexity factors "$\xi$" are updated, e.g., increased. The system returns to 528, such that, with every execution epoch (e.g., periodically—every 10 ms or via applied industry standard) this value will be updated until it reaches a significant threshold. These thresholds are maintained as industry standards for serviceability—as advised by service providers for their specific configurations.

As determined at 528, upon reaching a threshold, the process proceeds to step 532, where action is taken to optimize energy consumption of servers provisioning virtual functions that are being shared.

In an embodiment, the "significant" threshold value is a policy decision that is maintained in the PCF—Policy Control Function of the 5GC and is as advised by the service providers of the 5GC. The breach of the threshold is monitored by the SMF—Session Management Function. Once the significant threshold is breached, the event is triggered by the NEF—Network Exposure Function. Such events are "subscribed" by SSF—Slice Selection Function. The SSF then can provision for additional corrective action properly (provided more compute power, cloned, time multiplexed, etc.). The updated corrective action is updated with the repository by NRF—Network Repository Function. Accordingly, a new session is established by SMF—Session Management Function of the 5GC.

Thus, the event is handled and the state of operations are transitioned to a new state of normal. The process can then proceed to 536, FIG. 5 where a new pair of service chains are being monitored for received events, and the process proceeds to 502 to repeat the MC method and determine the state of these new service chains.

Returning to 528, if after waiting a pre-determined threshold of epochs or after waiting a pre-determined time period, the mutual convexity factors for the current service chains do not reach a significant threshold, the process can return to 536, FIG. 5 where a new pair of (independent and/or dependent) service chains are being monitored for received events to determine their impact of interferences of one service chain on the other, and the process proceeds to 502 to repeat the MC method and determine the state of these new service chains.

Figure 6:
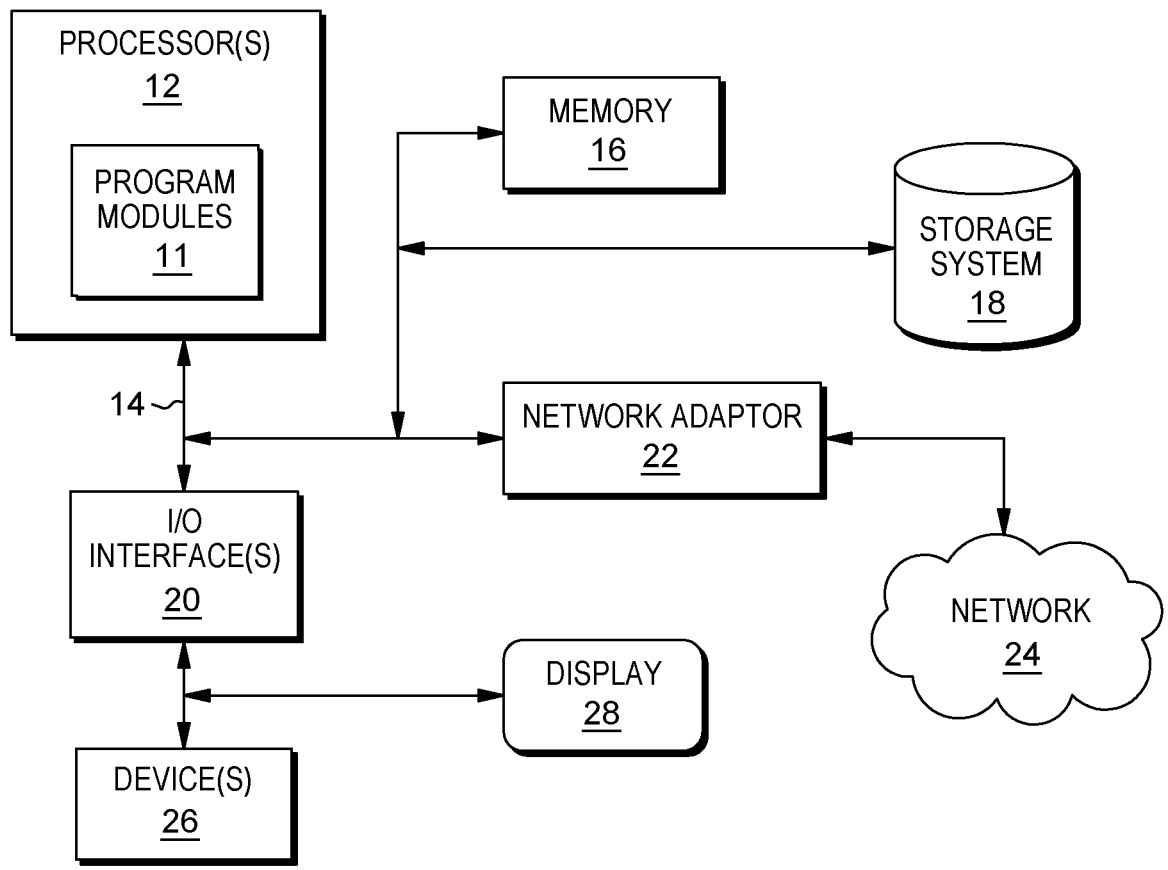
FIG. 6 illustrates an example computing system in which processes involved in the system, method, and computer program product described herein may be implemented in accordance with the present invention.

FIG. 6 illustrates an example computing system in accordance with the present invention. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the present invention (see e.g., FIG. 2).

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory and/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
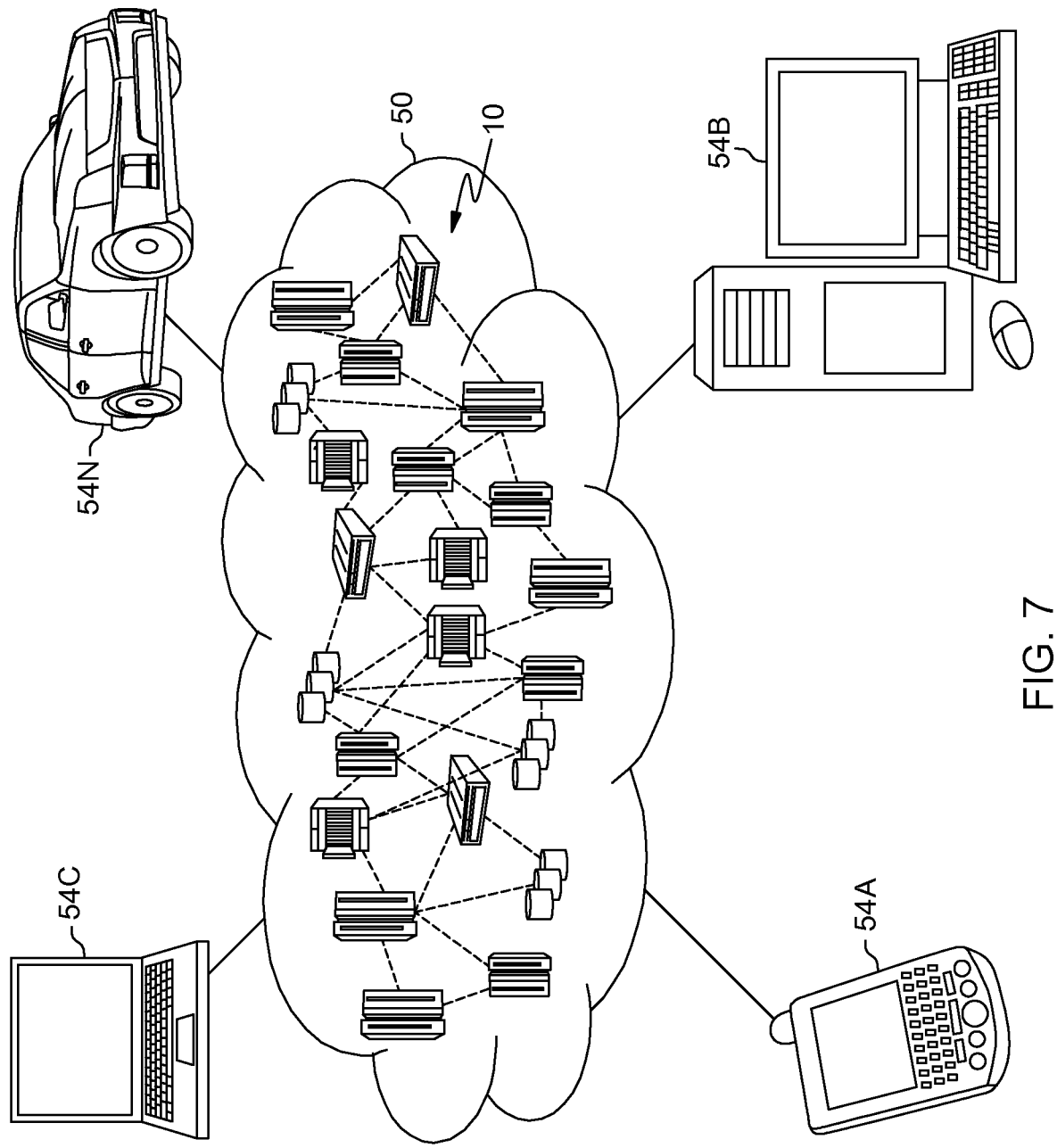
FIG. 7 depicts a cloud computing environment according to an embodiment of the present invention.

Referring now to FIG. 7 illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 8:
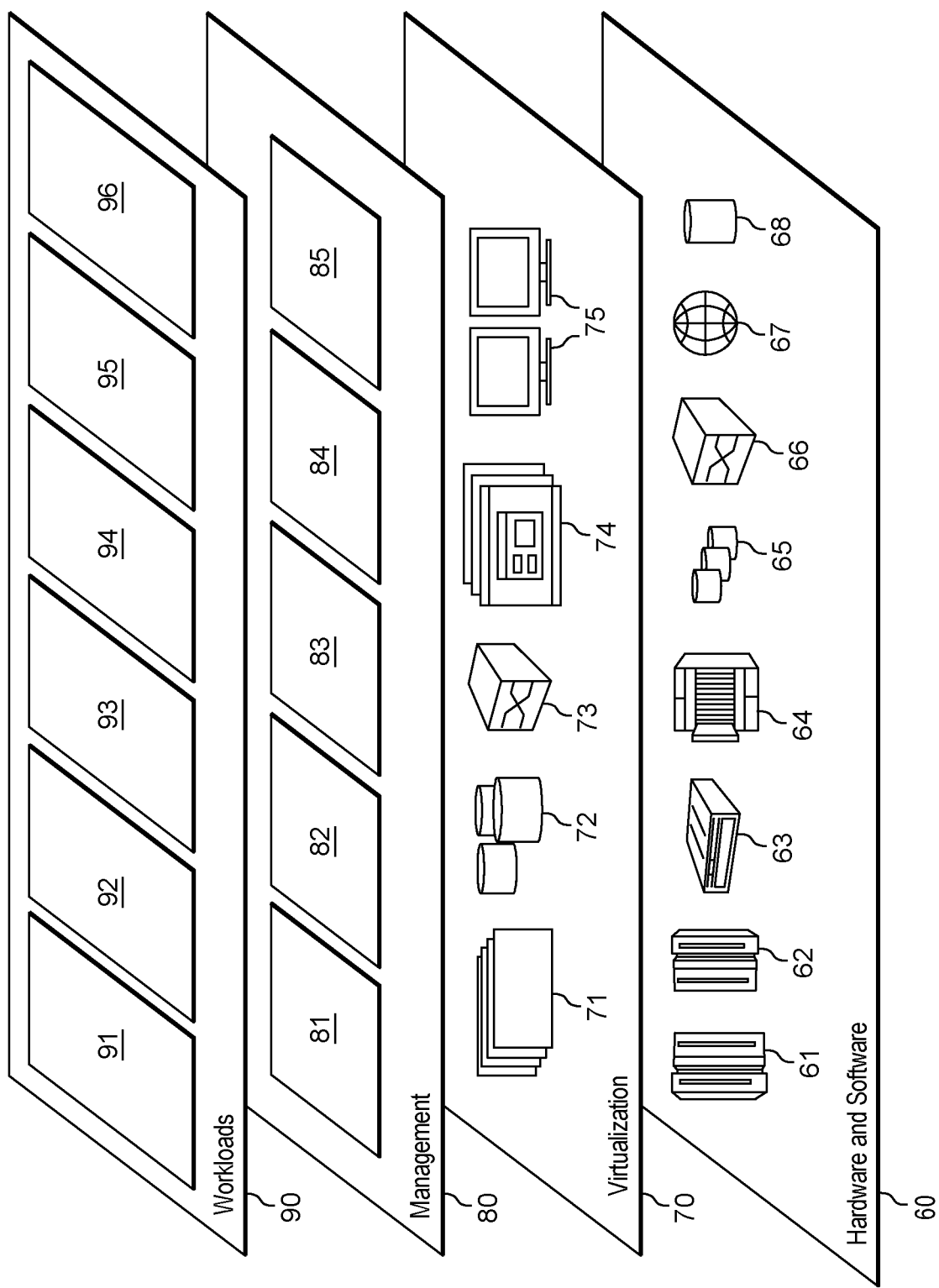
FIG. 8 depicts abstraction model layers according to an embodiment of the present invention.

Referring now to FIG. 8, a set of functional abstraction layers provided by cloud computing environment 50 (FIG. 1) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the mutual convexity service processing 96.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
receiving, at one or more hardware processors, event data generated by at least two service chains configured as a series of virtual network functions operable to provide services on computing devices of a virtualized network;
generating, at one or more hardware processors, a joint probability function based on co-occurring event data generated by said at least two service chains;
determining, based on said generated joint probability function, a cross-interference impact of a first service chain upon a second service chain of said provisioned at least two service chains;
quantifying the cross-interference impact by determining a convexity rate for each said first and said second service chain, and determining, based on said convexity rate for each said first and said second service chain, a mutual convexity factor quantifying the cross-interference impact between:
the first service chain dependent on the second service chain; and
the second service chain dependent on the first service chain;
comparing, using said one or more hardware processors, said mutual convexity factor against a pre-determined threshold; and
responsive to said comparing resulting in said mutual convexity factor exceeding said pre-determined threshold, optimizing a use of the virtualized network resources to avoid service failure or service degradation of said at least two service chains, said optimizing a use of the virtualized network resources comprising preventing power consumption in excess of an energy needed to provision said virtualized network functions at said computing devices of the virtualized network.

2. The computer-implemented method according to claim 1, wherein said determining a cross-interference impact comprises:
representing corresponding events occurring at a common time as at least two discrete random variables associated with each said first and said second service chains;
generating the joint probability distribution function of said at least two discrete random variables occurring at the common time;
determining, based on said joint probability distribution function, an amount of additional information required to represent a value of a next observation of one of the service chains; and
quantifying, based on said amount of additional information, said cross-interference impact.

3. The computer-implemented method according to claim 2, wherein said determining an amount of additional information comprises:
determining the convexity rate for each first and said second service chain, said convexity rate determined for one or more of:
an instance where a next event observation at the first service chain is dependent upon a current event occurring at said second service chain; and
an instance where a next event observation at the first service chain is independent of a current event occurring at said second service chain.

4. The computer-implemented method according to claim 1, wherein responsive to said comparing resulting in said mutual convexity factor not exceeding said pre-determined threshold, said method further comprising:
updating periodically or via a set schedule, said mutual convexity factor until said mutual convexity factor exceeds said pre-determined threshold.

5. A system for managing resources of a service chain comprising:
at least one processor comprising hardware, the at least one processor configured to:
receive event data generated by at least two service chains configured as a series of virtual network functions operable to provide services on computing devices of a virtualized network;
generate a joint probability function based on co-occurring event data generated by said at least two service chains;

determine, based on said generated joint probability function, a cross-interference impact of a first service chain upon a second service chain of said provisioned at least two service chains;
quantify the cross-interference impact by determining a convexity rate for each said first and said second service chain, and determining, based on said convexity rate for each said first and said second service chain, a mutual convexity factor quantifying the cross-interference impact between:
the first service chain dependent on the second service chain; and
the second service chain dependent on the first service chain;
compare said mutual convexity factor against a pre-determined threshold; and
responsive to said comparing resulting in said mutual convexity factor exceeding said pre-determined threshold, optimize a use of the virtualized network resources to avoid service failure or service degradation of said at least two service chains, said optimizing a use of the virtualized network resources comprising preventing power consumption in excess of an energy needed to provision said virtualized network functions at said computing devices of the virtualized network.

6. The system according to claim 5, wherein to determine a cross-interference impact, the at least one processor is further configured to:
represent corresponding events occurring at a common time as at least two discrete random variables associated with each said first and said second service chains;
generate the joint probability distribution function of said at least two discrete random variables occurring at the common time;
determine, based on said joint probability distribution function, an amount of additional information required to represent a value of a next observation of one of the service chains; and
quantify, based on said amount of additional information, said cross-interference impact.

7. The system according to claim 6, wherein to determine the amount of additional information, the at least one processor is further configured to:
determine the convexity rate for each first and second service chain, said convexity rate determined for one or more of:
an instance where a next event observation at the first service chain is dependent upon a current event occurring at said second service chain; and
an instance where a next event observation at the first service chain is independent of a current event occurring at said second service chain.

8. The system according to claim 5, wherein responsive to said comparing resulting in said mutual convexity factor not exceeding said pre-determined threshold, said at least one processor is further configured to:
update periodically or via a set schedule, said mutual convexity factor until said mutual convexity factor exceeds said pre-determined threshold.

9. A non-transitory computer readable storage medium comprising instructions that, when executed by at least one processor comprising hardware, configures the at least one hardware processor to:

receive event data generated by at least two service chains configured as a series of virtual network functions operable to provide services on computing devices of a virtualized network;
generate a joint probability function based on co-occurring event data generated by said at least two service chains;
determine, based on said generated joint probability function, a cross-interference impact of a first service chain upon a second service chain of said provisioned at least two service chains;
quantify the cross-interference impact by determining a convexity rate for each said first and said second service chain, and determining, based on said convexity rate for each said first and said second service chain, a mutual convexity factor quantifying the cross-interference impact between:
the first service chain dependent on the second service chain; and
the second service chain dependent on the first service chain;
compare said mutual convexity factor against a pre-determined threshold; and
responsive to said comparing resulting in said mutual convexity factor exceeding said pre-determined threshold, optimize a use of the virtualized network resources to avoid service failure or service degradation of said at least two service chains, said optimizing a use of the virtualized network resources comprising preventing power consumption in excess of an energy needed to provision said virtualized network functions at said computing devices of the virtualized network.

10. The non-transitory computer readable storage medium according to claim 9, wherein to determine h cross-interference impact, the instructions further configure the at least one hardware processor to:
represent corresponding events occurring at a common time as at least two discrete random variables associated with each said first and said second service chains;
generate the joint probability distribution function of said at least two discrete random variables occurring at the common time;
determine, based on said joint probability distribution function, an amount of additional information required to represent a value of a next observation of one of the service chains; and
quantify, based on said amount of additional information, said cross-interference impact.

11. The non-transitory computer readable storage medium according to claim 9, wherein the instructions further configure the at least one hardware processor to:
compare said mutual convexity factor against a pre-determined threshold; and
responsive to said comparing resulting in said mutual convexity factor exceeding said pre-determined threshold, optimize the use of the virtualized network resources to avoid service failure or service degradation of said at least two service chains; or
responsive to said comparing resulting in said mutual convexity factor not exceeding said pre-determined threshold, said at least one processor is further configured to:
update periodically or via a set schedule, said mutual convexity factor until said mutual convexity factor exceeds said pre-determined threshold.

* * * * *